May 12, 1970     H. F. ZIMMERMAN     3,511,472
LIMITING FLOW VALVE
Filed Jan. 12, 1968
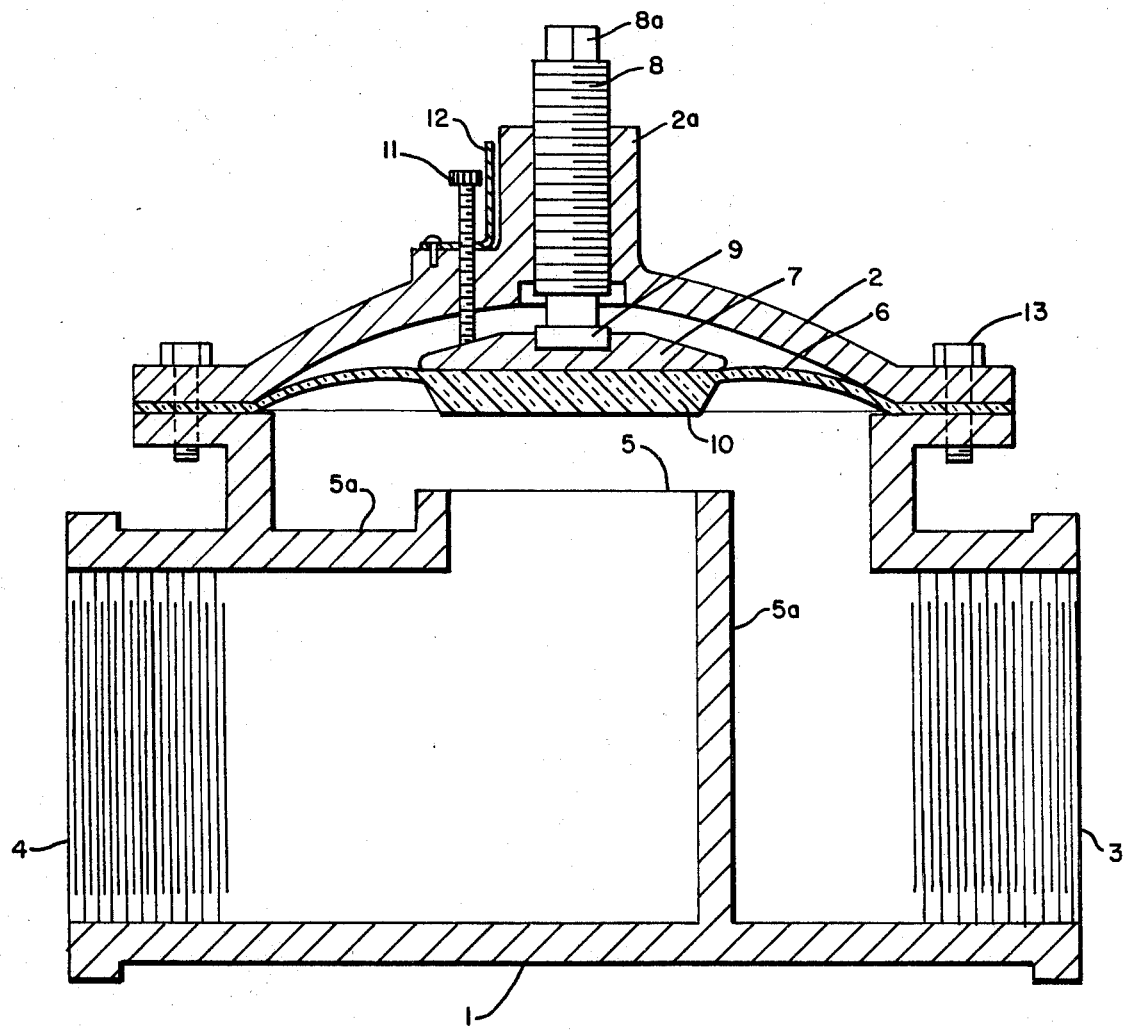
INVENTOR.
HAROLD F. ZIMMERMAN
BY *Edward M. Stentsen*
ATTORNEY United States Patent Office 3,511,472
Patented May 12, 1970

3,511,472
LIMITING FLOW VALVE
Harold F. Zimmerman, Cordova, Ill., assignor to American Air Filter Company, Inc., Louisville, Ky., a corporation of Delaware
Filed Jan. 12, 1968, Ser. No. 697,401
Int. Cl. F16k 7/12
U.S. Cl. 251—285         2 Claims

ABSTRACT OF THE DISCLOSURE

A diaphragm type fluid flow control valve having a housing providing a valve seat through which fluid flows and which is adapted to receive a diaphragm in sealing relation to selectively prevent such fluid flow through the valve. The diaphragm carries a backing plate to reinforce the portion of the diaphragm which contacts the valve seat and an adjustable set screw extends through a bonnet, which is cooperatively fastened to the housing, to contact the backing plate so movement of the diaphragm with respect to the valve seat can be selectively limited.

BACKGROUND OF THE INVENTION

In certain fluid flow systems it is desirable to include a valve which can be selectively opened or closed and which also provides means to limit the maximum rate of fluid flow through the valve. One example of such an application is in a heating system where a tempering fluid is circulated through heat exchange means, for example ventilators, located in various areas or rooms in a building to heat or cool air in the building. In such an application it is necessary to control the maximum flow to every individual heat transfer apparatus so most of the tempering fluid is not supplied to only a few heat exchangers and to make certain that all the heat exchangers receive an adequate supply of tempting fluid. To accomplish this purpose valves are installed in the tempering fluid supply system downsetream of each heat exchanger and also to provide means to shut off flow or modulate the flow at some rate less than the selected maximum.

To limit the valve opening some previous valves of the rising stem type, where the valve member is lifted away from the valve seat by the valve stem, have included ocmplex castings or machined parts to be attached to the valve or the valve bonnet to contact the rising stem. Various other types of valves, including valves with non-rising stems, have provided means to limit the number of rotations of the valve stem to limit the maximum opening of the valve. All such previous valves have been expensive because they are complex and the working eelments of many such valves have been exposed to the fluid so the elements have been subject to corrosion.

SUMMARY OF THE INVENTION

The present invention provides a diaphragm type valve including a straightforward economical arrangement which can be used in either a rising stem or non-rising stem type valve to limit the maximum opening of the valve. Furthermore, it has been recognized that the present invention provides a valve which can be selectively opened to allow fluid flow up to the selected maximum rate or closed to shut off flow where the maximum opening of the valve is easily and selectively adjusted and the adjusting elements are isolated from the fluid flowing through the valve and are not subject to corrosion.

Various other features of the present invention will become obvious to those skilled in the art upon reading the disclosure set forth hereinafter.

More particularly, the present invention provides a valve comprising: a housing having a fluid inlet, a fluid outlet, means defining a valve seat in the housing intermediate the fluid inlet and the fluid outlet, and bonnet means to receive adjustable stem means; diaphragm means disposed within the housing to be urged to sealing relation with the valve seat and to isolate the bonnet means to support at least a portion of the diaphragm which contacts the valve seat; adjustable valve stem means to be received by the bonnet means to selectively move the diaphragm means relative to the valve seat to regulate the flow of fluid through the valve and to urge the backing plate and the diaphragm means against the valve seat in sealing relation; and, adjustable stop means carried by the bonnet means and isolated from the fluid flowing through the valve to contact the surface of the backing plate to restrict movement of the backing plate and the diaphragm with respect to the valve seat.

It is to be understood that the example of the present invention given hereinafter is not by way of limitation and that various changes can be made in the arrangement, form, or configuration of the apparatus disclosed herein without departing from the scope or spirit of the present invention.

Referring to the drawing which shows one example of a valve in accordance with the present invention, a housing 1 is provided with inlet and outlet means 3 and 4 which can include means to fasten the valve to a cooperative piping ssytem, for example by threads as shown. Casing 1 can be adapted to receive a bonnet 2 which can be adapted to be fastened to casing 1 for example by means of bolts 13 and provides a threaded sleeve 2a to receive a valve stem 8. Baffle means 5a are provided in casing 1 to form an internal valve seat 5 as shown.

A diaphragm member 6 is disposed in the casing and can include a valve portion 10 to be received in sealing relation by valve seat 5. Diaphragm 6 can be of a elastomeric material and, in the example shown in the figure, is fastened between the bonnet and the valve casing to isolate the bonnet from the fluid flowing through the valve.

In accordance with one feature of the present invention, a backing plate 7 is provided to furnish reinforcement to valve portion 10 of diaphragm 6. It will be noted that the diameter of backing plate 7 can, advantageously, be at least as great as the diameter of the aperture as defined by baffle 5a so valve portion 10 is urged against the entire periphery of the aperture to assure a tight closure of the valve to shut off fluid flow.

The back plate of the example can be fastened to diaphragm 6 but in many applications it is not necessary to fix the valve to the backing plate because the diaphragm is lifted from the seat by the difference in pressure between the fluid carried by the valve and the pressure in the bonnet above diaphragm 5.

In accordance with another feature of the present invention, bonnet 2, as shown in the example of the figure, includes a threaded aperture to receive an adjustable set screw 11 which extends through bonnet 2 to contact backing plate 7 when it is moved away from valve seat 5 to increase fluid flow through the valve. The set screw advantageously contacts the backing plate rather than the diaphragm member to prevent unnecessary wear and failure of the diaphragm.

As hereinbefore described, bonnet 2 provides a sleeve 2a adapted to receive valve stem 8, which can have an end 8a adapted to receive a handle and the other end fixed to a rotatable socket member 9 to be connected to backing plate 7. Rotation of valve stem 8 moves the valve stem longitudinally in threaded sleeve 2a to move backing plate 7 and valve 10 relative to valve seat 5. Rotatable socket element 9 is provided to prevent rotation of backing plate with rotation of stem 8.

To adjust the valve opening, set screw 11 can be withdrawn nearly completely from the bonnet chamber and member 10 can be opened to provide the desired maximum flow. Set screw 11 is then advanced into bonnet 2 until it contacts backing plate 7 and movement of valve 10 relative to seat 5 is then limited in one direction by the position of screw 11 but the valve still can be adjusted to give any flow rate less than the maximum.

The invention claimed is:

1. A valve comprising: a casing defining a fluid flow conduit having a fluid inlet, fluid outlet, with means defining a valve seat inset casing intermediate said fluid inlet and said fluid outlet, and cooperative bonnet means; elastomeric diaphragm means disposed within said housing to be urged to sealing relation with said valve seat and to isolate said bonnet from said fluid flowing through said valve casing; rigid backing plate means having a major diameter greater than the diameter of said valve seat connected to the side of said diaphragm means opposite said valve seat and isolated from said fluid flowing through said casing to supporting the portion of said diaphragm which contacts said valve seat; stem means freely rotatably connected to said backing plate and received by said bonnet means to be moved toward and away from said valve means to urge said backing plate and said diaphragm means against said valve seat to regulate fluid flow through said casing and to be selectively positioned in spaced relation from said seat to regulate flow of fluid through said valve seat; and adjustable stop means to contact said backing plate means to restrict movement of said backing plate and said diaphragm member relative to said valve seat.

2. The valve of claim 1 wherein said adjustable stop means includes adjustable screw means to extend through said bonnet to contact said backing plate.

References Cited

UNITED STATES PATENTS

| | | | |
|---|---|---|---|
| 1,069,067 | 7/1913 | Huxford | 251—331 XR |
| 2,853,268 | 9/1958 | Hughes | 251—285 |
| 2,869,571 | 1/1959 | Price et al. | 251—331 XR |
| 2,875,977 | 3/1959 | Stone et al. | 251—331 |
| 3,012,751 | 12/1961 | Hauser | 251—285 XR |
| 3,399,695 | 9/1968 | Stehlin | 251—331 XR |

HENRY T. KLINKSEIK, Primary Examiner

U.S. Cl. X.R.

251—331

UNITED STATES PATENT OFFICE
CERTIFICATE OF CORRECTION

Patent No. 3,511,472                                                    May 12, 1970

Harold F. Zimmerman

It is certified that error appears in the above identified patent and that said Letters Patent are hereby corrected as shown below:

Column 1, line 40, "downsetream" should read -- downstream --; line 45, "ocmplex" should read -- complex --; line 52, "eelments" should read -- elements --. Column 2, line 27, "ssytem" should read -- system --; line 48, "back" should read -- backing --; line 73, insert the paragraph:

A valve position indicator 12 can be fastened to the bonnet so the position of set screw 11 indicates the limit to which the valve can be opened.

Column 3, line 20, "supporting" should read -- support --.

Signed and sealed this 6th day of April 1971.

(SEAL)
Attest:

EDWARD M. FLETCHER, JR.                          WILLIAM E. SCHUYLER, JR.
Attesting Officer                                            Commissioner of Patents